Oct. 23, 1923.
J. G. BOWSER
PROCESS OF CONSTRUCTING MATS
Filed Feb. 13, 1922
1,471,376
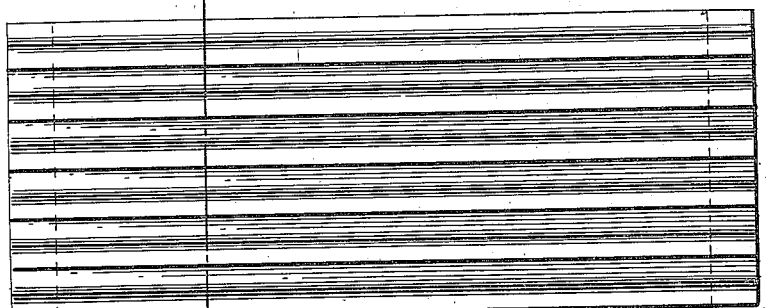
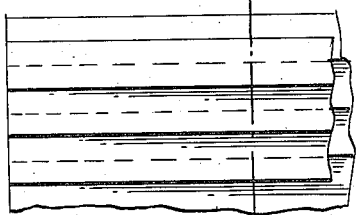
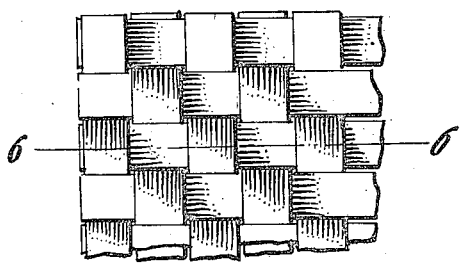
Inventor
James G. Bowser
By Richard B. Owen
Attorney
WITNESSES Patented Oct. 23, 1923.

1,471,376

UNITED STATES PATENT OFFICE.

JAMES G. BOWSER, OF COLUMBUS, KANSAS.

PROCESS OF CONSTRUCTING MATS.

Application filed February 13, 1922. Serial No. 536,178.

*To all whom it may concern:*

Be it known that I, JAMES GARFIELD BOWSER, a citizen of the United States, residing at Columbus, in the county of Cherokee and State of Kansas, have invented certain new and useful Improvements in Processes of Constructing Mats, of which the following is a specification.

The present invention relates to a process of constructing mats which are especially useful on stone or concrete floors, pavements, and the like for silencing purposes and also to provide dry walking surfaces. In fact, the mats may be used for any purpose for which ordinary mats are now commonly used.

The principal object of the invention is to utilize discarded automobile tire casings or shoes.

In the drawing:—

Figure 1 is a plan view of a mat constructed in accordance with my invention,

Figure 2 is a section taken therethrough on the line 2—2 of Figure 1,

Figure 3 is a fragmentary plan view of a modified form of the mat,

Figure 4 is a section taken therethrough on the line 4—4 of Figure 3,

Figure 5 is a fragmentary plan view of a third modification of the mat, and

Figure 6 is a section taken therethrough on the line 6—6 of Figure 5.

Referring to the drawing in detail and especially the modification shown in Figures 1 and 2 it will be seen that tire casings or shoes are cut to desired lengths and breadths and that they are arranged longitudinally of each other so that adjacent edges are overlapped and securely attached to each other by means of some cementitious material or if so desired by sewing.

In Figures 3 and 4 the second modification has been disclosed wherein the tire casings or shoes are cut to the desired length and breadth and are arranged along side of each other so that their longitudinal sides overlap. The mat, however, in this modification is made in a plurality of layers and the longitudinal edges of the superimposed layers are arranged so as to be situated over the longitudinal centers of the casings or shoes immediately there-below. These longitudinal edges are fixed together by some cementitious material or by sewing and the layers are likewise attached to each other. In Figures 5 and 6 a third modification has been disclosed wherein the tire shoes are cut to the desired length and breadth and are then arranged along side of each other so that a portion thereof will extend at right angles to another portion thereof so that two layers are formed and these shoes or casings are interwoven as is clearly shown in the drawings and will be readily understood.

Having thus described my invention what I claim as new is:—

1. The process of forming mats consisting of first cutting tire casings or shoes to desired lengths and breadths, and second arranging the shoes or casings in engaging relation to each other, and third fixing the engaging portions of the casings to each other.

2. A process of forming mats consisting in first cutting tire shoes or casings to desired lengths and breadths second placing the casings or shoes so that portions thereof engage each other and third by cementing the engaging portions together.

3. The process of forming mats consisting in first cutting tire shoes or casings to desired lengths and breadths, second placing the casings or shoes along side of each other longitudinally so that adjacent longitudinal edges overlap each other, and third cementing the overlapping edges together.

4. A process of forming mats consisting in first cutting tire casings or shoes to desired lengths and breadths, second placing a portion of the shoes along side of each other longitudinally so that their edges overlap, third forming a second layer in similar manner and fourth cementing the abutting portions of the shoes together.

In testimony whereof I affix my signature in presence of two witnesses.

JAMES G. BOWSER.

Witnesses:
J. C. BOWSER,
MINNIE B. MURRAY.